US 6,749,705 B2

(12) United States Patent
Skrzyniarz et al.

(10) Patent No.: US 6,749,705 B2
(45) Date of Patent: Jun. 15, 2004

(54) ADHESIVE AND USE THEREOF

(75) Inventors: Ronald J. Skrzyniarz, Easton, PA (US); Lisa Brown, Warren, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 226 days.

(21) Appl. No.: 10/002,459

(22) Filed: Nov. 15, 2001

(65) Prior Publication Data

US 2003/0091811 A1 May 15, 2003

(51) Int. Cl.⁷ .................................. B32B 31/12
(52) U.S. Cl. ..................... 156/78; 156/79; 156/327; 156/332; 524/459; 524/503
(58) Field of Search .................... 156/78, 79, 327, 156/332, 334; 524/459, 503

(56) References Cited

U.S. PATENT DOCUMENTS

| 3,734,819 A | * | 5/1973 | Knutson ..................... 428/463 |
| 4,128,518 A | | 12/1978 | Oyamada et al. |
| 4,195,109 A | | 3/1980 | Long |
| 4,921,898 A | | 5/1990 | Lenney et al. |
| 5,695,855 A | * | 12/1997 | Yeo et al. ..................... 428/196 |

FOREIGN PATENT DOCUMENTS

| EP | 0 930 350 | 7/1999 |
| JP | 04198285 | 7/1992 |

* cited by examiner

*Primary Examiner*—Sam Chuan Yao
(74) *Attorney, Agent, or Firm*—Cynthia L. Foulke

(57) ABSTRACT

Adhesives for bonding paper facings to aerated concrete provide increased manufacturing efficiencies and long term stability of constructs prepared therewith. Adhesives may advantageously be used in the foamed state.

4 Claims, No Drawings

ADHESIVE AND USE THEREOF

FIELD OF THE INVENTION

The invention relates to an adhesive composition and to articles of manufacture comprising the adhesive. Particularly preferred embodiments of the invention relate to a foamed adhesive and to wallboard sheets comprising a concrete core material bonded to a face layer with the foamed adhesive.

BACKGROUND OF THE INVENTION

Wallboard sheets are widely used in building construction to form, e.g., the walls and ceilings of rooms and the like. Such wallboard sheets generally comprise a gypsum core with outer face layers of paper, and are typically referred to as gypsum board, sheet rock or drywall. Gypsum wallboard is typically manufactured by delivering a slurry or paste containing crushed gypsum rock onto a moving sheet of facing paper to which a second or top paper layer is then added to form a long board line. The board line permits the slurry to harden before being cut. The cut panels are heated in a kiln, before being packaged for storage and shipping. Typically, such sheets are ½ or ⅝ inch thick and in conventional sizes of 4×8 feet, and may weigh from about 55 to about 70 pounds. Accordingly, handling of such gypsum wallboards presents a significant task for construction personnel or wallboard "hangers", particularly when such boards are secured overhead to form a ceiling. In addition, the fire resistance, thermal insulation and sound absorbing properties of conventional gypsum wallboard sheets may not be sufficient for some applications, such as walls between adjacent apartments.

The use of aerated concrete as the core material in wallboard sheeting is known and has been used successfully in countries outside the United States, including Europe and Japan. Published International patent WO 00/27866 describes a wallboard sheet comprising an aerated concrete core covered with outer face layers.

Aerated concrete is a steam cured mixture of sand or pulverized fuel ash, cement, lime and an aeration agent. High pressure steam curing in an autoclave produces a physically and chemically stable product with an average density being about one fifth that of normal concrete. The material includes non connecting air cells, and this gives aerated concrete some of it its unique and advantageous properties such as good strength, low weight (a 1 inch thick, 4 foot by 8 foot wallboard sheet typically has a total weight of about 60 pounds), good thermal insulation properties, good sound deadening properties, and has a high resistance to fire. Aerated concrete has durability similar to conventional concrete or stone, has a thermal conductivity six to ten times better than conventional concrete and is non-rotting, non-toxic and resistant to termites.

Like conventional sheet rock, aerated concrete sheets may be manufactured to have beveled portions adjacent respective opposing side edges, may be readily cut to size by first scoring the face sheet, and then snapping the board about the score line, may be easily fastened to a suitable building frame, the seams between adjacent wallboards covered (taped and spackled) to provide an even wall surface, and may be painted or, alternatively, covered with a decorative wall covering.

Aerated concrete provides advantages over conventional gypsum wallboard in terms of increased fire resistance, thermal insulation, sound deadening, and other properties, and, in addition, because of the relative light weight, substitution of aerated concrete for gypsum facilitates, shipping, handling, and installation at a job site.

While wall sheet materials formed of aerated concrete cores offer many advantages over convention gypsum material, there continues to be a need in the art for an adhesive useful for bonding paper face stock material to aerated core material which is economical (i.e., will not add significantly to the cost of the final wall sheet material) and which exhibits long term stability, a problem encountered in the prior art use of aerated concrete. The current invention fulfils this need in the art by providing an adhesive formulation capable of increasing manufacturing efficiencies and long term stability of constructs prepared therewith.

SUMMARY OF THE INVENTION

The invention provides an adhesive that is both economical, in particular when used in its foamed state, and is capable of stably bonding a paper face stock material to an aerated concrete core material.

The present invention relates to an adhesive and, in particular, to a foamed adhesive, as well as to articles of manufacture comprising the adhesive.

One aspect of the invention is directed to a water based adhesive comprising ethylene vinyl acetate and/or propylene vinyl acetate, and a polyvinyl alcohol. The adhesive preferably also comprises at least one filler such as clay. In a preferred embodiment the adhesive is foamed.

Another aspect of the invention is directed to an article of manufacture comprising the adhesive described herein. The article comprises a core material and a surface material, wherein the core material and surface material are bonded together with adhesive/foamed adhesive. In a preferred embodiment, the substrate material is concrete and the surface material is a paper stock material. In an even more preferred embodiment, the core material is an aerated concrete material. Articles of manufacture encompassed by the invention include aerated concrete sheet materials.

A wallboard sheet of the invention comprises a core having opposing first and second major surfaces; said core comprising aerated concrete; and at least one face layer on at least one of the first and second major surfaces of said core, wherein at least one of said face layer is bonded to the core with the adhesive or the foamed adhesive described herein.

Yet another aspect of the invention is directed to a method for bonding materials together which comprises applying the adhesive or the foamed adhesive composition described herein to a first substrate, bringing a second substrate in contact with the adhesive composition applied to the first substrate, and subjecting the applied composition to conditions which will allow the composition to cool and form a set bond. In a preferred embodiment, at least one of said substrates comprise a concrete material. In a particularly preferred embodiment, one substrate is an aerated concrete and one substrate is a paper stock material.

DETAILED DESCRIPTION OF THE INVENTION

An adhesive has now been discovered that may be used to stably bond paper stock materials to concrete, aerated concrete and the like. The adhesive may advantageously be used in the foamed state. By foaming, less water is introduced into the construction, the temperature requirements of the heaters may be decreased, and line speed may be increased. The foamed adhesive when used in the practice of the invention has sufficient wet bond strength for holding sheets of paper material to concrete panels as these panels are moved through a heating and pressing zone.

The adhesives of the invention may be used to prepare various articles of manufacture, but are particularly useful in bonding paper face stock to aerated concrete panels in the preparation of wallboard sheet material.

The preparation of aerated concrete panels are known in the art and need not be described in detail herein. Reference is made to published international application WO 00/27866.

Use of "paper" face stock includes paper and paperboard products, both single- and multi-ply (e.g., paper laminates) sheets made from without limitation, Kraft paper, paper made from recycled fibers and the like. The term face stock is used herein to refer to both face and backer paper.

Adhesives of the invention comprise a vinyl acetate copolymer, a polyvinyl alcohol and, optionally, at least one filler. Typically, the adhesive will comprises from about 15% to about 50% by weight of the vinyl acetate component and from about 3% to about 7% by weight of the polyvinyl alcohol component. Amounts of from about 2% up to about 30% by weight of the filler will generally be used. Other conventional additives, including preservative/biocides or the like may also be added, with water added to total 100%.

Preferred for use are ethylene vinyl acetate or propylene vinyl acetate or mixtures thereof. Ethylene vinyl acetate and propylene vinyl acetate copolymers are well known commercially available materials. Exemplary techniques for their preparation are described in, for example U.S. Pat. Nos. 2,200,429 and 2,396,785. The percent of vinyl acetate in the copolymer will generally range from about 4% to about 80% by weight and a melt index of about 0.1 to 1000 grams per minute. The vinyl acetate copolymer typically will be alcohol or surfactant stabilized.

While ethylene vinyl acetate or propylene vinyl acetate or mixtures thereof may be use in the practice of the invention, the use of ethylene vinyl acetate has been discovered to be particularly advantageous in terms of long term stability of the adhesive bonds when used to secure paper face stock material to a concrete or aerated concrete substrate. Thus, a preferred adhesive for use in the practice of the invention will comprise ethylene vinyl acetate.

Ethylene vinyl acetate copolymers are available from DuPont Chemical Co., Wilmington, Del. under the tradename Elvax® (e.g., Elvax® 210 which has a melt index of 400 grams/10 minutes and a vinyl acetate content of 28% by weight in the copolymer, Elvax® 205W which has a melt index of 800 and a vinyl acetate content of about 28% by weight in the copolymer and Elvax® 410 which has a melt index of 500 and a vinyl acetate content of about 18% by weight). Other ethylene vinyl acetate copolymers are available from Exxon Chemical Co. under the tradename Escorene® (e.g., UL 7505) and also from Millennium Petrochemicals, Rolling Meadows, Ill., under the tradename Ultrathene® (e.g., UE 64904) and AT® copolymers available from AT Polymers & Film Co., Charlotte, N.C. (e.g., AT® 1850M), and also from ATOFINA under the tradename Evatane (e.g 28–420). Still others are available from National Starch and Chemical Company under the tradename DUR-O-SET®.

The polyvinyl alcohol for use in the invention will be at least partially hydrolyzed. By partially hydrolyzed means that the degree of hydrolysis will be at least 87% or greater, preferably 89% or greater. Preferably, the polyvinyl alcohol will be fully hydrolyzed, i.e., the degree of hydrolysis will be about 98.5% or greater. Polyvinyl alcohol is commercially available from Air Products, Celanese and Du Pont, among others.

Particularly preferred adhesives comprise ethylene vinyl acetate, a fully hydrolyzed polyvinyl alcohol, and at least one filler. In a preferred embodiment, the adhesive comprising ethylene vinyl acetate, a fully hydrolyzed polyvinyl alcohol, and at least one filler, will be a foamed adhesive.

Suitable fillers are those fillers known in the art as adhesives fillers and include polysaccharides, calcium carbonate, clay, mica, nut shell flours, silica, talc and wood flour. A clay filler may typically be used to prepare adhesives for use in the practice of the invention. The addition of a filler allows for foam generated to remain consistent and stable for several hours.

In addition to fillers, other additives typical of adhesive compositions may be added to the foamable composition. Said additives include, but are not limited to, plasticizers, acids, waxes, synthetic resins, tackifiers, defoamers, preservatives, bases such as sodium hydroxide, dyes, pigments, UV indicators, and other additives commonly used in the art.

The adhesive may also contain a surface-active agent. Examples of surface-active agents include anionic, cationic, amphoteric, or nonionic surfactants, or mixtures thereof. Suitable anionic surfactants include, alkyl sulfonates, alkylaryl sulfonates, alkyl sulfates, sulfates of hydroxylalkanols, alkyl and alkylaryl disulfonates, sulfonated fatty acids, sulfates and phosphates of polyethoxylated alkanols and alkylphenols, and esters of sulfosuccinic acid. Suitable cationic surfactants include, alkyl quaternary ammonium salts, and alkyl quaternary phosphonium salts. Suitable non-ionic surfactants include the addition products of 5 to 50 moles of ethylene oxide adducted to straight-chain and branched-chain alkanols having 6 to 22 carbon atoms, alkylphenols, higher fatty acids, higher fatty acid amines, primary or secondary higher alkyl amines, and block copolymers of propylene oxide with ethylene oxide, and mixtures thereof. When used, the surface active agent will typically be added in amounts up to about 20% by weight, based on the foamable composition as a whole. More usually from amounts of from about 0.05 to about 20% by weight, and preferably at from 0.2 to 2% by weight.

Preservatives for use herein include those conventionally used in aqueous adhesives such as benzoates, amides and fluorides such as sodium fluoride. Also included are the hydroxybenzoic acid esters such as p-hydroxybenzoic acid methyl ester or p-hydroxybenzoic butyl ester. Commercially available preservatives which may be used in the practice of the invention include KATHON LXE sold by Rohm & Haas Company and Nipacide OBS sold by Clariant. The preservative will generally be included in amounts of from 0.05% to about 0.2% by weight.

The foamable adhesive composition of the invention is foamed by the addition of energy, by means known in the art such as, but not limited to, by mechanical and/or chemical means. Air or other gases are added to the foamable adhesive composition along with the addition of said energy to produce a stable, consistent foamed adhesive. Preferably air is used to produce the foamed adhesive. The adhesive foam may be produced by mechanical means such as mechanical stirring or agitation, introduction of gases or by chemical means.

The amount of air dispersed in the adhesive can vary depending on the particular formulation, but will generally be from about 10% (by volume) up to about 50% (by volume) or greater.

The adhesive may be applied by any method known in the art. Typically the particle board is coated with from about 2½ to about 6 wet mils of foamed adhesive, most typically about 3 mils. Preferably, the foamed adhesive is applied using a roll coater, also referred to in the art as a glue spreader. Top and bottom double sided coaters are advantageously used in the practice of the invention In a preferred method of this invention, pressure is applied in a continuous process at a temperature of less than about 140° F., most preferably about 120° F. to about 140° F. The pressure at which bonding takes place is generally greater than 20 psi (138 Kpa). Heat may be introduced by heating elements, or by heating rollers. Typical bonding pressure is no more than 300 psi, although higher pressure is possible. Pressure may be applied to the construction by any suitable means. Preferably, pressure is applied via a roller or by hot pressing. The most preferred method of applying pressure is via a nip roller.

The bonding temperatures that may be used in the practice of the invention are lower than prior art temperatures used when employing unfoamed adhesives and require less power usage in the process, reduced cycle time between successive laminate presses, saves on processing costs and improves productivity. The method of this invention may be substantially automated for mass production techniques and utilizes a relatively small amount of foamed adhesive when compared with prior art methods.

The invention is further illustrated by the following non-limiting example.

EXAMPLE

An adhesive comprising 54.90% water, 5.00% fully hydrolyzed polyvinyl alcohol, 20.0% ethylene vinyl acetate (DUR-O-SET), 20.00% clay filler (Englehart) and 0.10% Kathon LX was prepared by first cooking the polyvinyl alcohol with the filler in water heated to 200° F. for one hour. After being heated for one hour the adhesive is cooled to a temperature of 120° F. or lower before adding the ethylene vinyl acetate emulsion. Kathon LX was then added as biocide.

The adhesive prepared as above was foamed to a level of 40%. The foamed adhesive was then coated onto an aerated concrete board at a coating weight of 4–5 wet grams per square foot. The paper was then mated and nipped, then dead stacked under slight pressure for two minutes. After the two minutes, bond strength was measured. A good paper tearing bond was found to have been achieved.

The foamed adhesive was also used to bond paper to aerated concrete that had moisture content of 20%. The moisture present came from the process of making the aerated concrete. To get 20% moisture in the lab samples used in this example, the boards were soaked in water for one minute, then placed in an oven set at 130° C. for three minutes before the facings were bonded as above. Bond strength was then measured. As in the above test, good paper tearing bonds were achieved.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A wallboard sheet comprising a core having opposing first and second major surfaces; said core comprising concrete; and at least one face layer on at least one of the first and second major surfaces of said core, wherein at least one of said face layer is bonded to the core with a foamed adhesive, said adhesive comprising water, from about 15 to about 50% of ethylene vinyl acetate and from about 3 to about 7% of a fully hydrolyzed polyvinyl alcohol.

2. The wallboard sheet of claim 1 wherein the core comprises aerated concrete.

3. The wallboard sheet of claim 2 wherein said at least one face layer comprises paper.

4. The wall board of claim 1 where the adhesive further comprises a filler.

* * * * *